(12) United States Patent
Sung et al.

(10) Patent No.: US 6,933,964 B2
(45) Date of Patent: Aug. 23, 2005

(54) SURVEILLANCE SYSTEM

(75) Inventors: Mao-Yen Sung, Chupei (TW); Shih-Che Lo, Ilan Hsien (TW)

(73) Assignee: Kingtek Electronics Technology Corp., Hsinchu Hsien (TW)

( * ) Notice: Subject to any disclaimer, the term of this patent is extended or adjusted under 35 U.S.C. 154(b) by 409 days.

(21) Appl. No.: 10/178,340

(22) Filed: Jun. 25, 2002

(65) Prior Publication Data

US 2003/0234860 A1 Dec. 25, 2003

(51) Int. Cl.[7] .................................................. H04N 7/18
(52) U.S. Cl. ........................ 348/143; 348/151; 348/152; 348/153; 348/159; 348/174; 348/207; 348/231; 358/909.1
(58) Field of Search ................................ 348/143, 151, 348/152, 153, 159, 174, 207, 231, 294; 358/909.1

(56) References Cited

U.S. PATENT DOCUMENTS 4,783,707 A * 11/1988 Nemoto et al. ................ 360/75
5,111,300 A * 5/1992 Nam ........................ 348/231.6

FOREIGN PATENT DOCUMENTS

JP         09152339 A  *  6/1997   ........... G01C/19/56

* cited by examiner

*Primary Examiner*—Shawn S. An
(74) *Attorney, Agent, or Firm*—Rosenberg, Klein & Lee

(57) ABSTRACT

The present invention relates to an improved surveillance system, more particularly to a surveillance system having the function of driving the camera for the scanning and tracking automatically by using a control panel, a motor controller, and a driver to drive the motor. Such motor works together with a rotary disc and a camera lens as well as a sensor to compute and memorize the direction and angle of rotation of the motor by the sensing signal.

7 Claims, 8 Drawing Sheets

SURVEILLANCE SYSTEM

BACKGROUND OF THE INVENTION

1. Field of the Invention

The present invention relates to an improved surveillance system, more particularly to a surveillance system with the function of driving the camera for the scanning and tracking automatically by using a control panel, a motor controller, and a driver to drive the motor. Such motor works together with a rotary disc and a camera lens as well as a sensor to compute and save the direction and angle of rotation of the motor by the sensing signal.

2. Description of the Related Art

The prior art surveillance system generally sets a camera on a motor-driven rotary device and allows the camera to scan sideway back and forth with a specific rotary speed in order to expand the scope of the surveillance of a fixed camera. The shortcomings of such traditional rotary camera surveillance include the blind spots created in the fixed traveling distance and the long time taken for the back and forth scanning of the camera. Bad people who intend to intrude the premises may get away with it very easily, and thus such system cannot really serve as a surveillance system in actual practice. To put the surveillance function into actual practice, current prior-art products have made improvements by adding a multi-functional camera device, such as the spherical camera attached to the ceiling which has the scanning, positioning, and tracking functions during the anti-theft surveillance and tape recording. Although improvements have been made, the components involved are complicated, and it thus increases the manufacturing cost. Furthermore, it requires coding related software program for the operation, which is also one of the shortcomings. As to the mechanical structure of the prior art surveillance system, the electric potential device is rotated in an equal distance and in synchronization with the rotation of the motor axle of the system. Generally, the mechanical structure of an electric potential device limits the rotary angle within 240 degrees, but such limitation fails to meet the requirements for the surveillance and recording environment.

To overcome the shortcomings of the prior art technology, and make the application more convenient and practical, the present inventor herein enhances the performance of the conventional surveillance system by performing a series of researches and developments to maximize the performance of the surveillance system, and finally succeeds to invent an improved structure of the surveillance system.

SUMMARY OF THE INVENTION

The main objective of this invention is to provide an improved structure for a surveillance system having the function of automatically driving and controlling the camera for the scanning and tracking by using a control panel, a motor controller, and a driver to drive and control the motor, and such motor works together with a rotary disc and a camera lens as well as works with a sensor to compute and memorize the direction and angle of rotation of the motor by the sensing signal.

To make it easier for our examiner to understand the objective of the invention, its structure, innovative features, and its performance, we use a preferred embodiment together with the attached drawings for the detailed description of the invention.

While the invention is described with respect to the embodiments and figures given below, the invention is not to be considered limited in scope to these embodiments, since variations and modification could be made by those skilled in the art within the spirit and scope of the present invention as defined by the following claims.

BRIEF DESCRIPTION OF THE DRAWINGS

The description is made with reference to the accompanying drawings, in which.

DETAILED DESCRIPTION OF THE PREFERRED EMBODIMENTS

Figure 1:
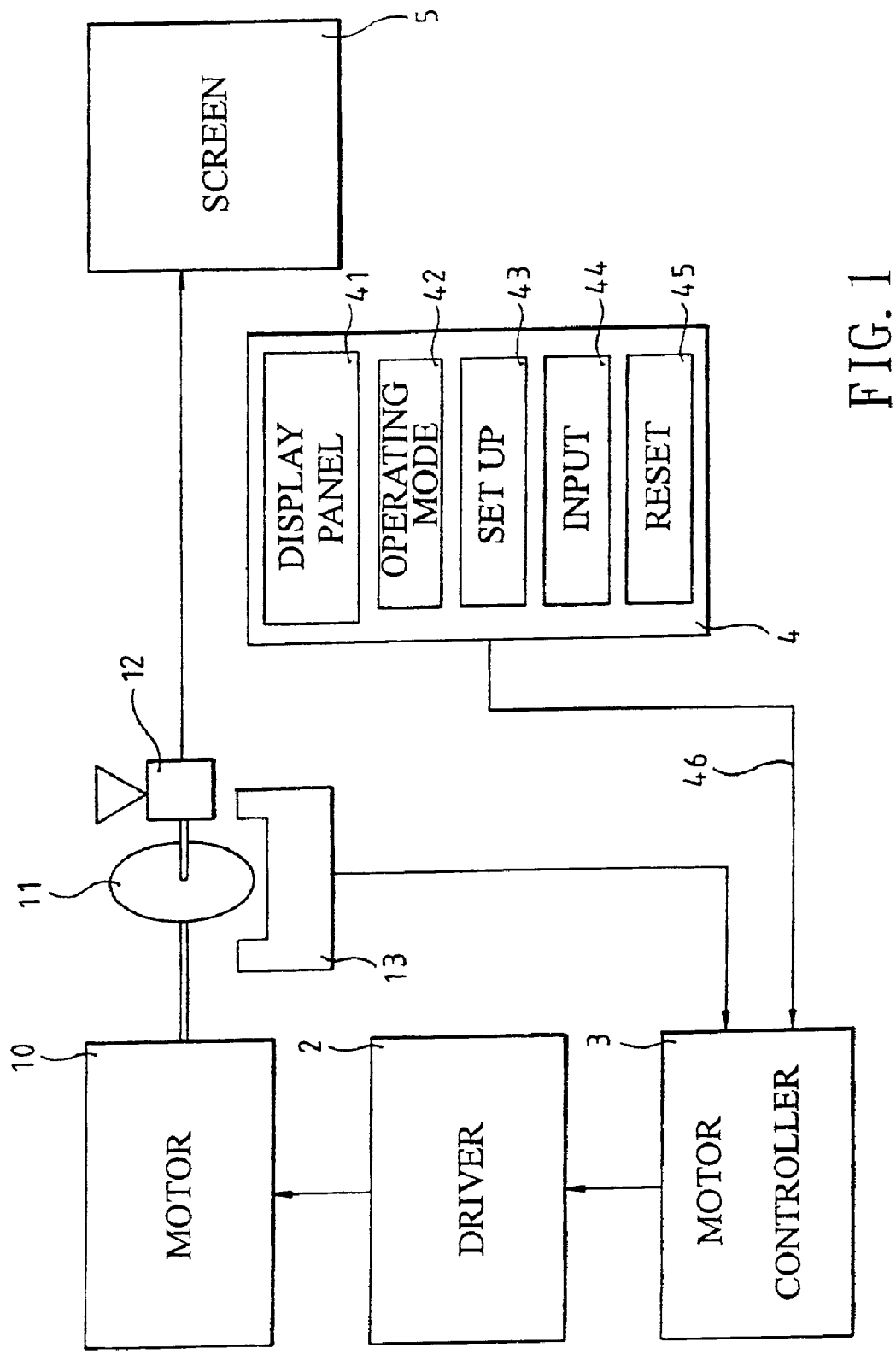
FIG. 1 is a schematic diagram of the major structure of the present invention.

Please refer to FIG. 1. The present invention relates to an improved surveillance system, comprising: a motor 10, a rotary disc 11, a camera lens 12, a plurality of sensors, a driver 2, a motor controller 3, and a control display system; wherein the driving axle of the motor 2 is coupled to the rotary disc 11 and the camera lens 12, and the sensors is installed onto the circumference of the rotary disc 11 with more than one light obstructer 13, and such light obstructer 13 can transmit the light passing signal to the motor controller 3. The control display system comprises a control panel 4 and a screen 5; wherein the control panel 4 further comprises a display panel 41, with the operating mode 42, set up 43, input 44, and reset 45, etc. The instruction line 46 sends instructions to the motor controller 3; and after the determination and analysis, the driver 2 will drive the motor either clockwise or anti-clockwise to a specific position, and the camera lens will output the image to the screen 5.

Figure 2:
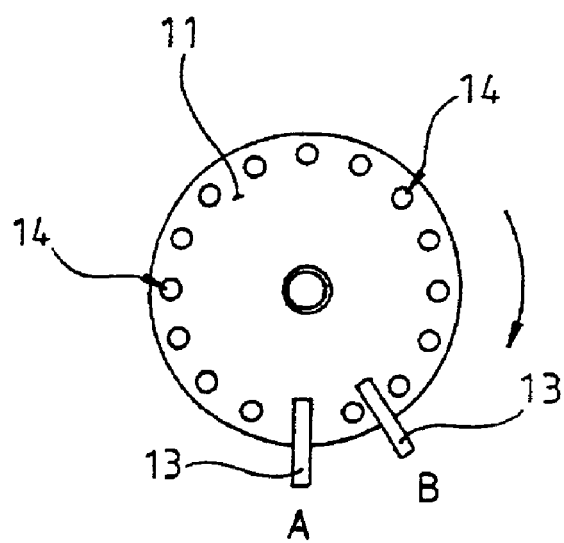
FIG. 2 is a schematic diagram of the structure of the rotary disc according to the present invention.
Figure 3:
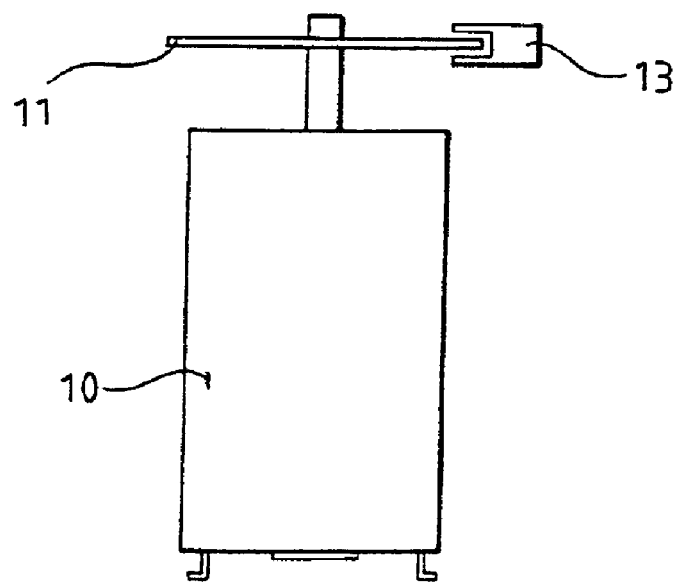
FIG. 3 is a schematic diagram of the structure of the light obstructer according to the present invention.
Figure 4:
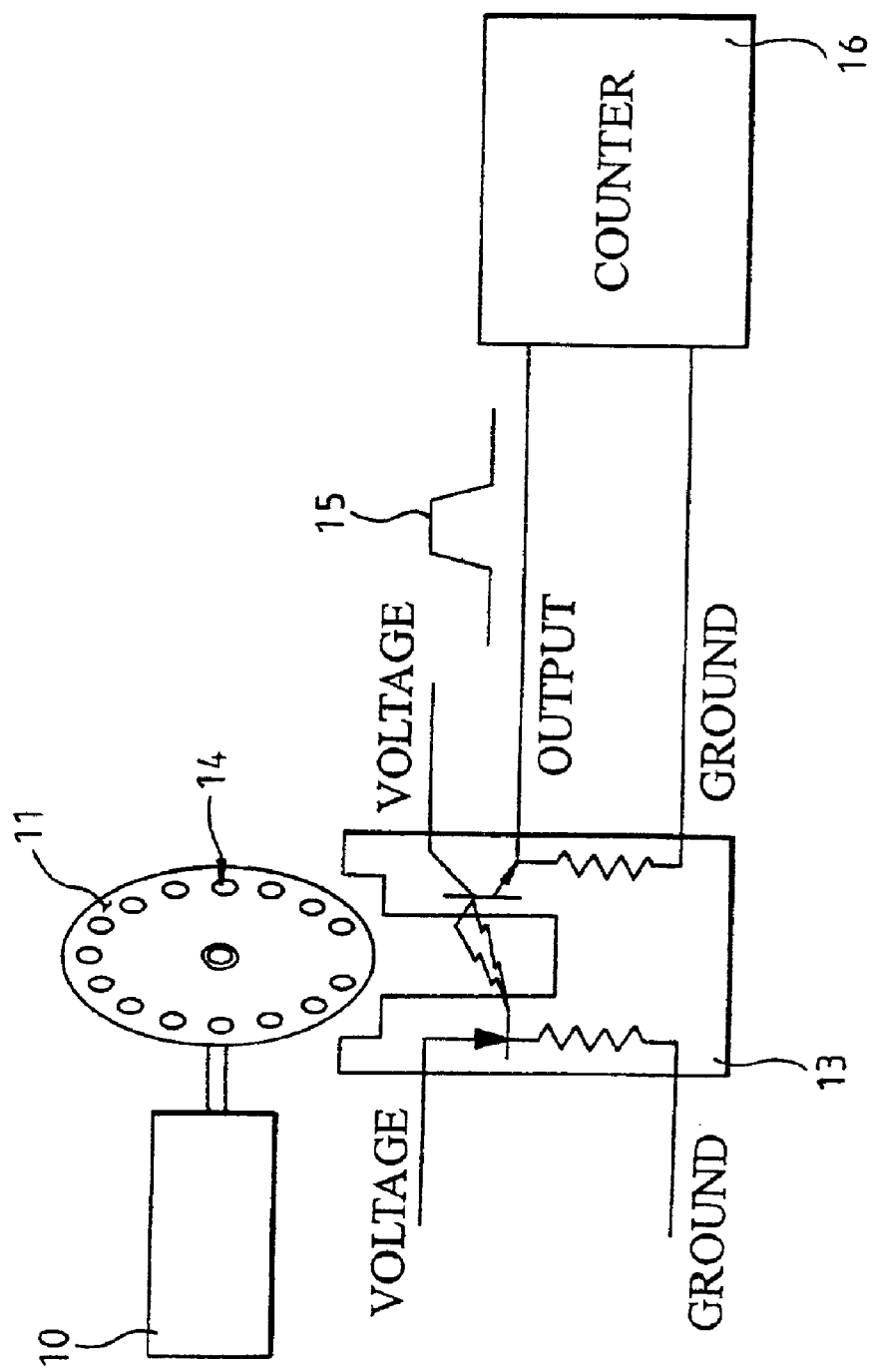
FIG. 4 is a schematic diagram of the circuit of the light obstructer according to the present invention.
Figure 5:
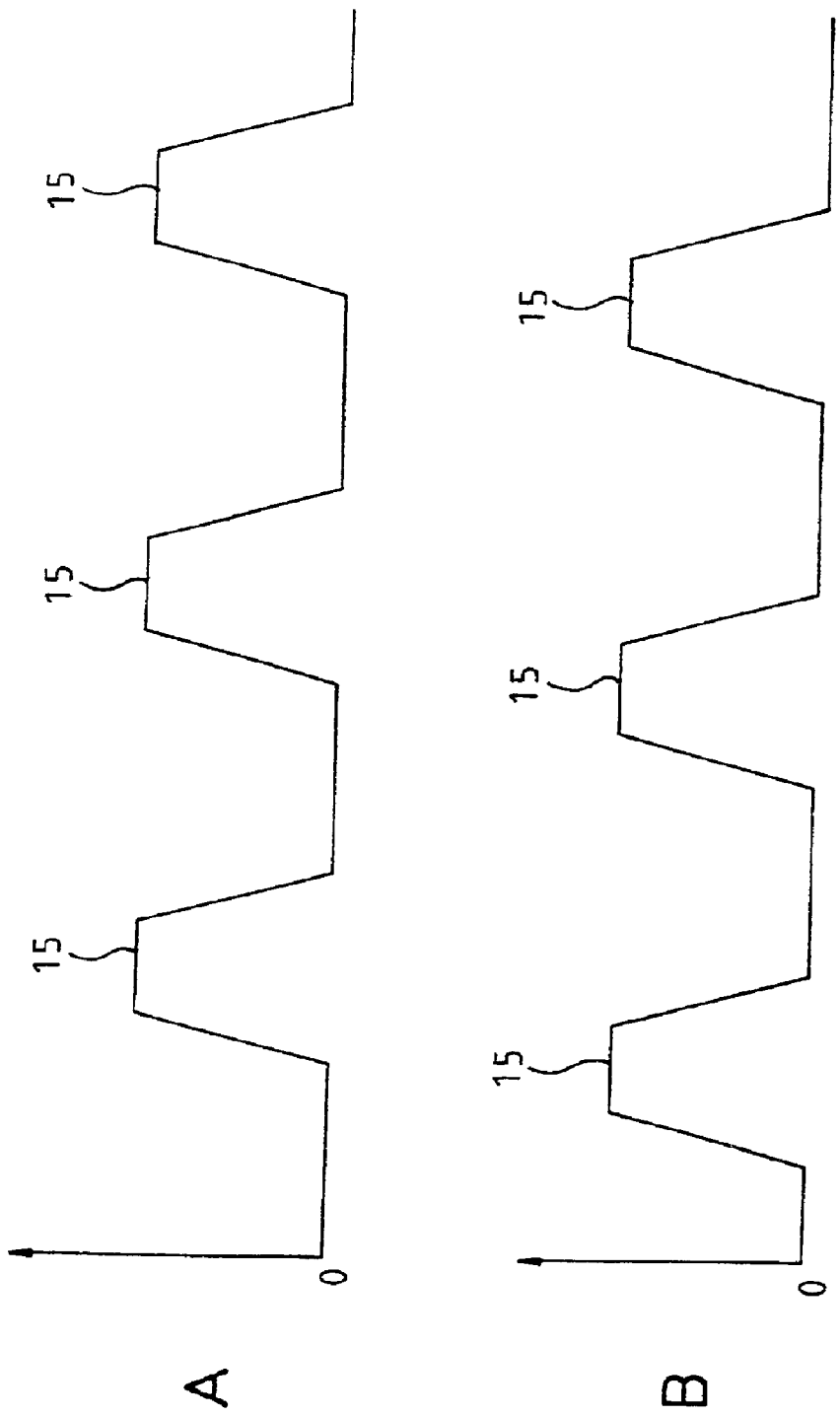
FIG. 5 is a schematic diagram of the signal of the light obstructer according to the present invention.

Please refer to FIGS. 2, 3, 4, and 5. The driving axle of the motor 10 is coupled to the rotary disc 11, and the rotary disc 11 has a plurality of equidistant holes 14 along its circumference, wherein one of the intervals does not have a hole 14. The sensor with more than one light obstructer 13 is installed on the rim of the rotary disc 11, and the light obstructer 13 at position A is installed at the interval without a hole 14, and another light obstructer 13 at position B is separated from the light obstructer at position A by [n+½] holes. When the motor rotates clockwise, the rotary disc 11 also rotates clockwise synchronously. The present invention works together with a light obstructer 13 such that a light passing signal 15 is generated by projecting the light from a light source onto the equidistant holes along the circumference of the rotary disc 11. In the meantime, a counter 16 is used for the counting and memorizing, and then the continual light passing signal 15 as shown in FIG. 2 is obtained. The starting point (reset condition) is set to be zero both at the position A and position B.

The operating mode of the surveillance system constituted by the foregoing components rotates the camera lens anti-clockwise to the starting point, and presets a plurality of surveillance positions for the camera with the appropriate surveillance and taping mode as required by the user. The user can also control and start the surveillance camera directly.

Figure 6:
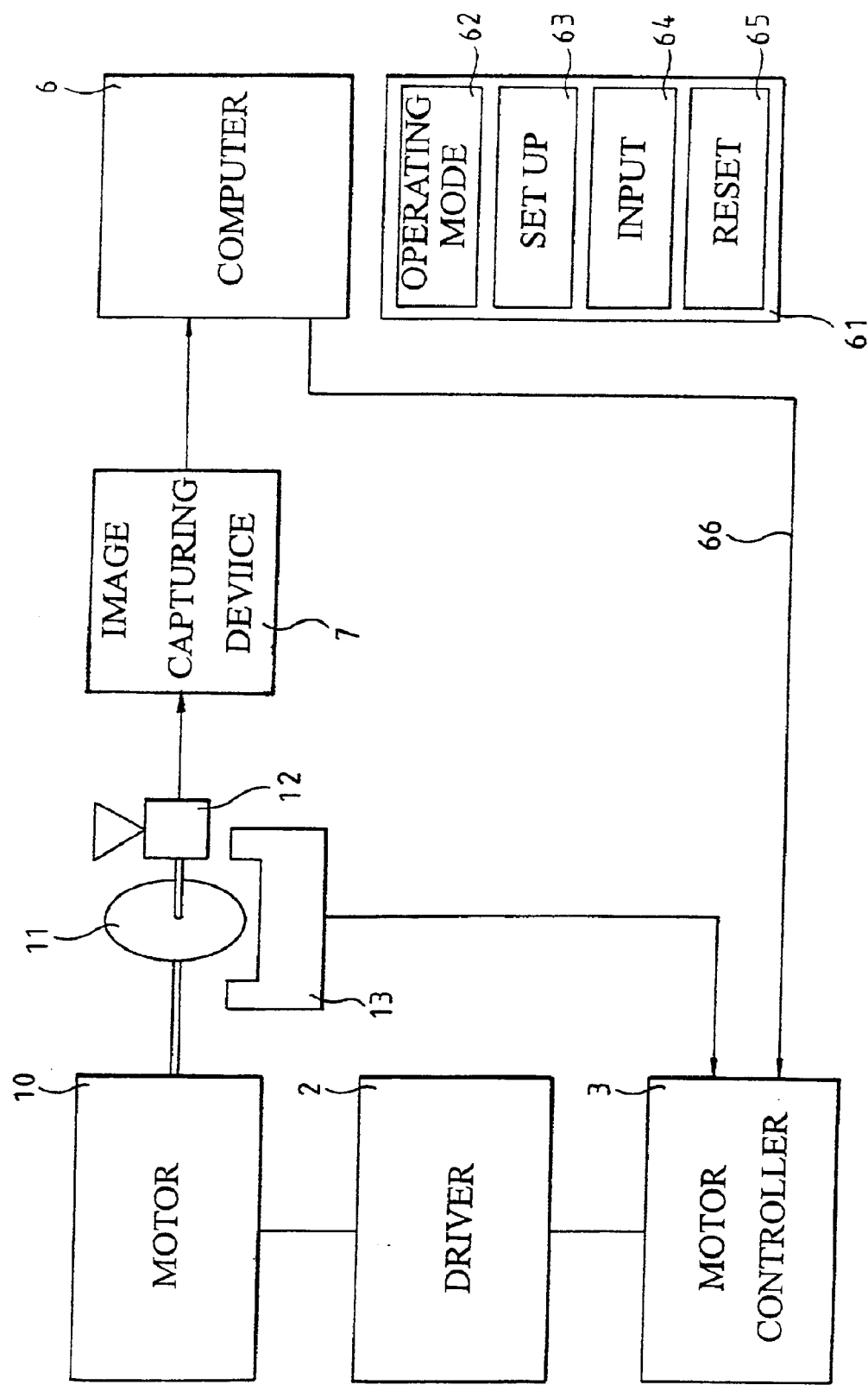
FIG. 6 is a schematic diagram of the structure of a preferred embodiment of the present invention.

Please refer to FIG. 6 for another embodiment of the present invention, mainly comprising a motor 10, a rotary disc 11, a camera lens 12, a plurality of sensors, a driver 2, a motor controller 3, and a control display system; wherein the control display system further comprises a computer 6, a software control panel 61, and the software control panel 61 has the functions of an operating mode 62, set up 63, input 64, and reset 65. The instruction line 66 sends the instruction to the motor controller 3, and the motor controller receives the light passing signal of the light obstructer 13 and the computer instruction signal. After the determination and analysis, the driver 2 will rotate either clockwise or anti-clockwise to a specific position, and the camera lens will output the image to the image capturing device 7 first and then to the computer 6.

Figure 7:
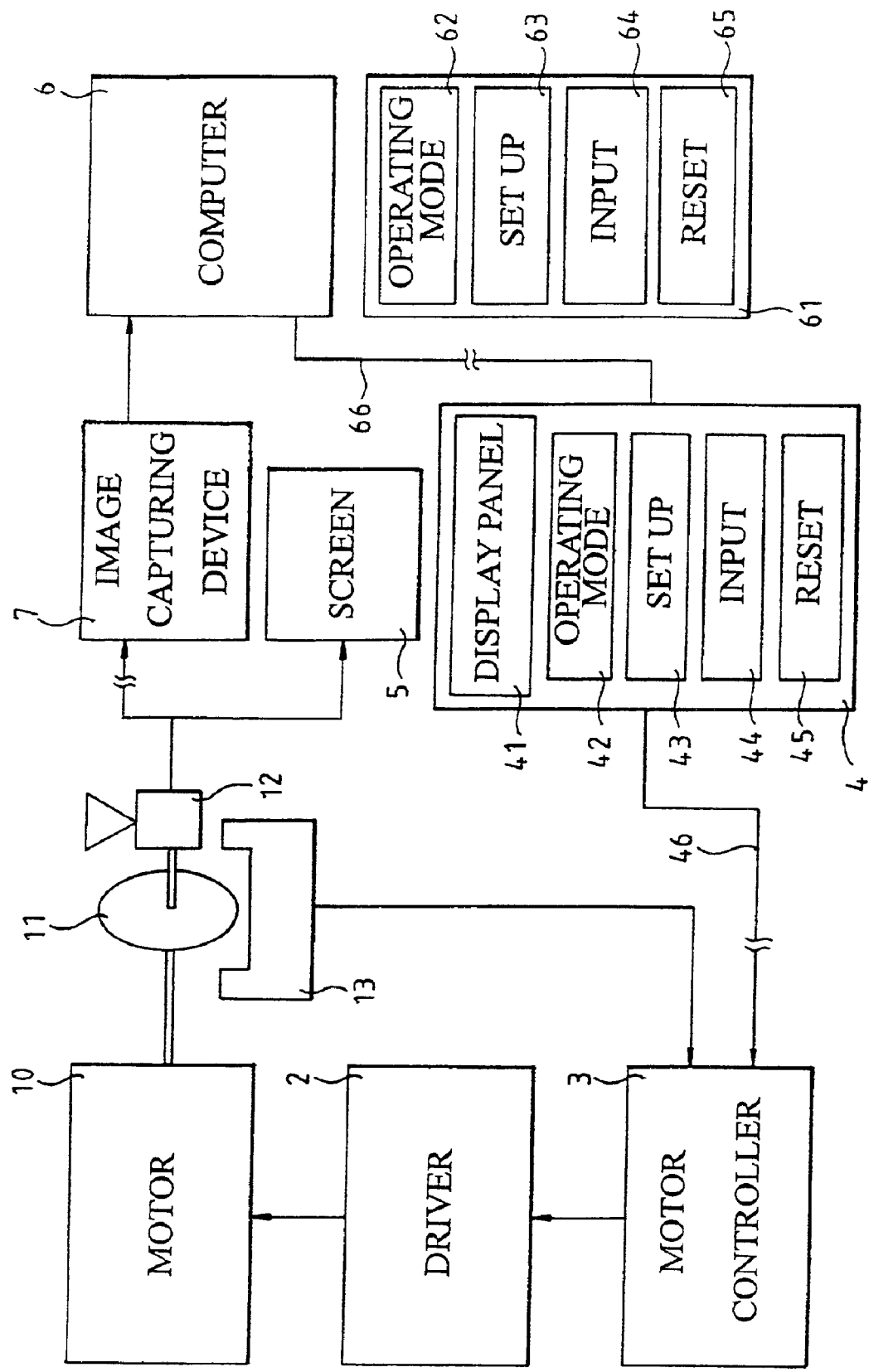
FIG. 7 is a schematic diagram of the structure of a second preferred embodiment of the present invention.

Please refer to FIG. 7 for another embodiment of the present invention, mainly comprising a motor 10, a rotary disc 11, a camera lens 12, a plurality of sensors, a driver 2, a motor controller 3, and a control display system; wherein the driving axle of the motor 10 is coupled to the rotary disc 11 and the camera lens 12; and the sensor is installed onto the circumference of the rotary disc 11 with more than one light obstructer 13, and the light obstructer 13 can send the light passing signal of the light obstructer to the motor controller 3. The control display system comprises a control panel 4, a screen 5, a computer 6, a software control panel 63, and an image capturing device 7; and the control panel 4 comprises a display panel 41, with an operating mode 42, set up 43, input 44, and reset 45 functions. The instruction line 46 sends the instruction to the motor controller 3; the computer 6 has a software control panel 61 which has an operating mode 62, set up 63, input 64, and reset 65 functions. The instruction line 66 sends the instruction to the control panel 4 or the motor controller 3. The motor controller 3 receives the light passing signal of the light obstructer 13 and instruction sent by the control panel 4 or the computer 6. After the determination and analysis, the driver 2 will rotate anti-clockwise or clockwise to drive the motor 10 to a specific position. The camera lens 12 outputs the image to the screen 5 or output the image to the image capturing device 1 first and then to the computer 6.

Figure 8:
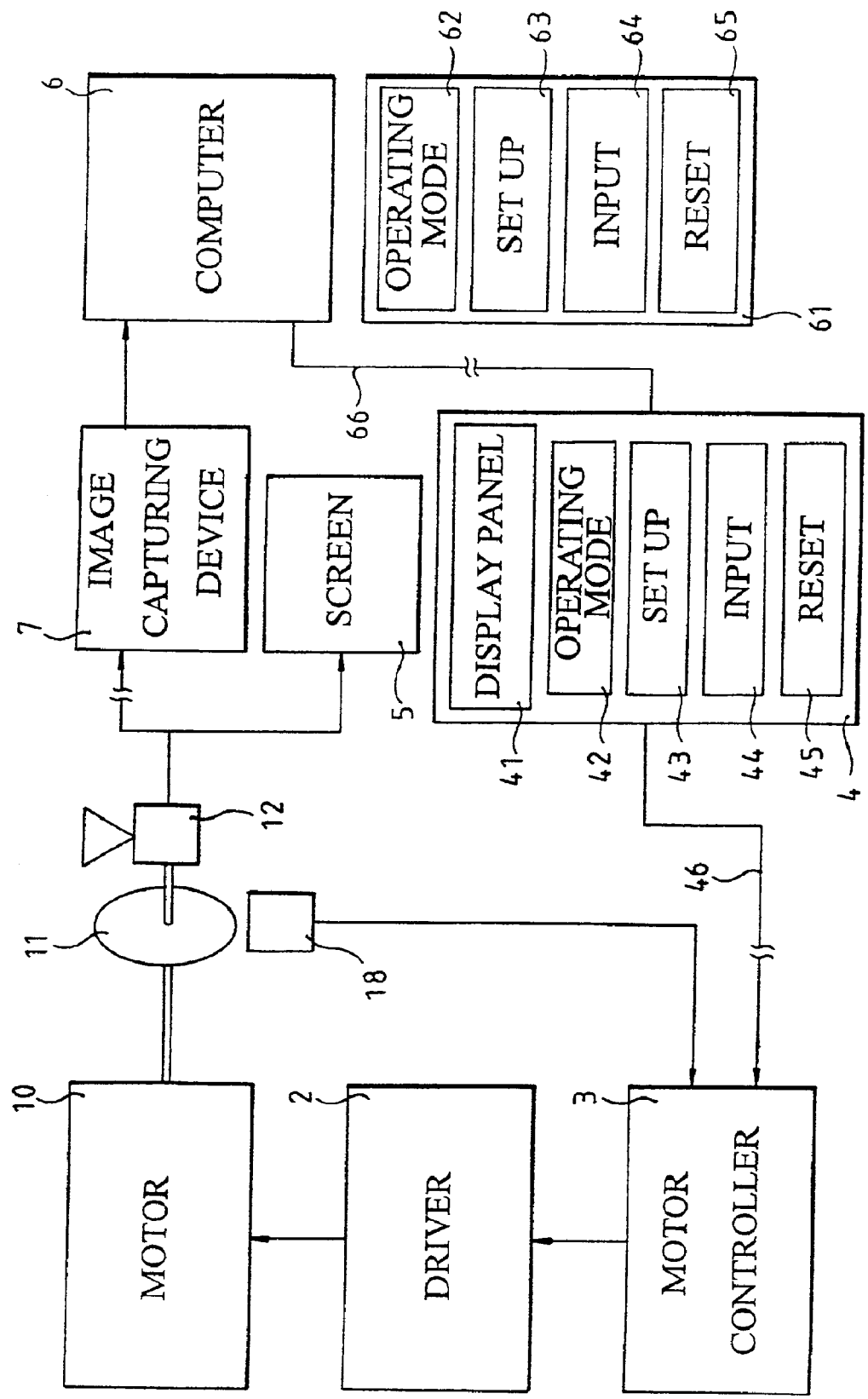
FIG. 8 is a schematic diagram of the structure of a third preferred embodiment of the present invention.
Figure 9:
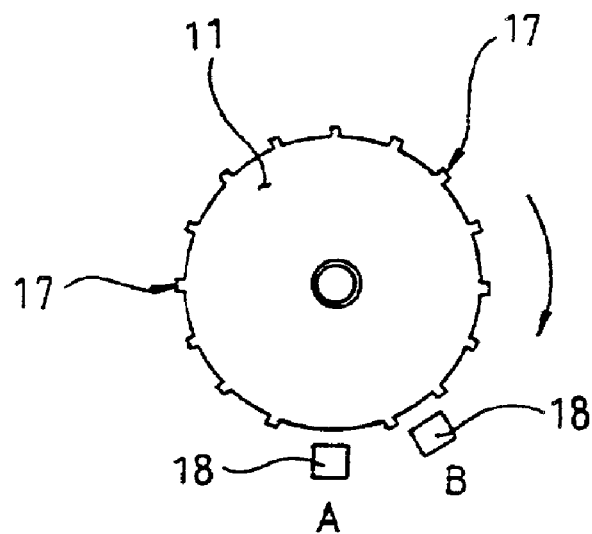
FIG. 9 is a schematic diagram of the structure of the rotary disc according to the present invention.
Figure 10:
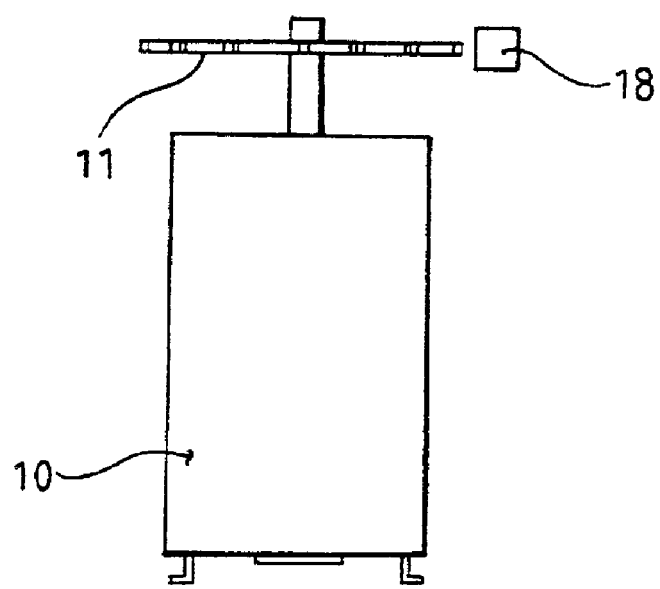
FIG. 10 is a schematic diagram of the structure of the proximately connected switch according to the present invention.

Please refer to FIG. 8 for another embodiment, comprising a motor 10, a rotary disc 11, a camera lens 12, a plurality of sensors, a driver 2, a motor controller 3, and a control display system; wherein the driving axle of the motor 10 is coupled to the rotary disc 11 and the camera lens 12; and the sensor is installed onto the circumference of the rotary disc 11 with more than one proximate connected switch 18. Please refer to FIGS. 9 and 10. The driving axle of the motor 10 is coupled to the rotary disc 11, and the rotary disc 11 has a plurality of equidistant sensing members 17 along the circumference of the rotary disc 11, in which one of the intervals does not have a sensing member 17. More than one proximately connected switch 18 are installed along the circumference of the rotary disc 11, where in the proximately connected switch at position A is installed on the rotary disc 11 at the interval where the sensing member 17 is not installed, and another proximately connected switch 18 at position B is separated from the position A by [n+(½)] intervals or n intervals of sensing members. The proximately connected switch 18 sends the sensed signal to the motor controller 3. The control display system comprises a control panel 4, a screen 5, a computer 6, a software control panel 61, and an image capturing device 7; and the control panel 4 further comprises a display panel 41 with an operating mode 42, set up 43, input 44, and reset 45 functions. The instruction line 46 sends the instruction to the motor controller 3; the computer 6 has a software control panel 61 which has an operating mode 62, set up 63, input 64, and reset 65 functions. The instruction line 66 sends the instruction to the control panel 4 or the motor controller 3. The motor controller 3 receives the light passing signal of the light obstructer 13 and instruction sent by the control panel 4 or the computer 6. After the determination and analysis, the driver 2 will rotate anti-clockwise or clockwise to drive the motor 10 to a specific position. The camera lens 12 outputs the image to the screen 5 or output the image to the image capturing device 1 first and then to the computer 6.

After the present invention is assembled as described above, it mainly provides an improved structure of a surveillance system with a function of automatically monitoring and recording the surveillance environment at several predetermined positions, and several operating modes can be set as the user's choice. In the meantime, the surveillance system of the present invention also has both automatic operating mode and manual operating mode. Furthermore, the present invention may work with a computer to accomplish the long-distance surveillance by remote control via the Internet. The present invention adopts the non-touching sensor such as the light obstructer and proximately connected switch, which can obtain a wider angle for the driven motor and the camera lens.

While the invention has been described in details by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention not only provides an innovative space configuration, but also enhances the performance of the conventional surveillance system, of which no identical or similar disclosure has been found in the market yet. The present invention further complies with the patent application requirements and is submitted to the Patent and Trademark Office for review and granting of the commensurate patent rights.

What is claimed is:

1. An improved surveillance system, comprising of a motor, a rotary disc, a camera lens, a plurality of sensors, a driver, a motor-driven controller, and a control display system; wherein: the driving axle of the motor being coupled to the rotary disc and the camera lens; said rotary disc having a plurality of equidistant intervals along a circumference of the rotary disc and a plurality of holes coincident with said plurality of intervals, one of the intervals being devoid of a hole; more than one of the sensors being disposed at the circumference of the rotary disc; the plurality of sensors sending the sensed signals to the motor controller, and the motor controller receiving the sensed signals from the sensors and an instruction signal from the control display system; after the determination and analysis, the driver being rotated clockwise or counter-clockwise to drive the motor to a specific position such that the camera lens outputs the image.

2. An improved surveillance system as claimed in claim 1, wherein the said plurality of sensors being installed along the circumference of the rotary disc with more than one light obstructer; and the light obstructer being disposed at the interval without a hole (Position A), and another light obstructer being disposed at Position B which being $[n+(\frac{1}{2})]$ intervals of holes from Position A.

3. An improved surveillance system as claimed in claim 1, wherein the said plurality of sensors being installed along the circumference of the rotary disc with more than one light obstructer; and the light obstructer being disposed at the interval without the hole (Position A), and another light obstructer being disposed at the n intervals from Position A.

4. An improved surveillance system as claimed in claim 1, wherein the said control display system comprising a control panel, a screen, a computer, a software control panel, and an image capturing device; said control panel further comprising a display panel with an operating mode, set up, input, and reset functions such that an instruction line sending the instruction to the motor controller; said computer having a software control panel, and said software control panel having an operating mode, set up, input, and reset functions, thereby the instruction line sending the instruction to the control panel or the motor controller.

5. An improved surveillance system as claimed in claim 1, wherein said rotary disc having a plurality of equidistant sensing members along the circumference of the rotary disc, among which one of the intervals having no sensing member.

6. An improved surveillance system as claimed in claim 1, wherein said plurality of sensors being installed along the circumference of the rotary disc with more than one proximately connected switch, and a proximately connected switch being disposed at an interval without a sensing member (Position A), and another proximately connected switch disposed at Position B being $[n+(\frac{1}{2})]$ intervals of the sensing members from Position A.

7. An improved surveillance system as claimed in claim 1, wherein said plurality of sensors being installed along the circumference of the rotary disc with more than one proximately connected switch, and a proximately connected switch being disposed at an interval without a sensing member (Position A), and another proximately connected switch disposed at Position B being n intervals of the sensing members from Position A.

* * * * *